May 7, 1963  J. W. JONES  3,088,173
PROCESS FOR PREPARING ORIENTED POLYMERIC LINEAR TEREPHTHALATE
FILM WITH A DEGLOSSED WRITEABLE SURFACE
Filed June 2, 1961
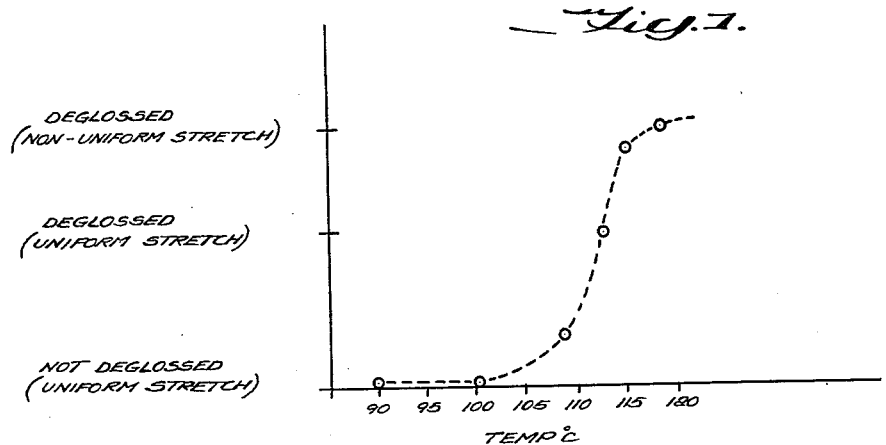
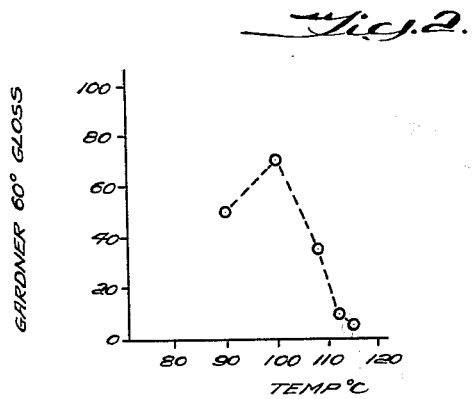
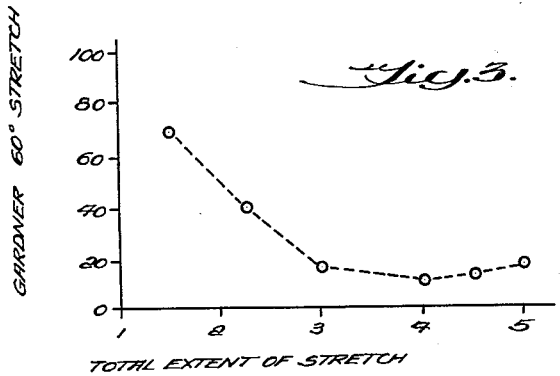
INVENTOR
JOHN W. JONES,
Robert W Black
AGENT United States Patent Office 3,088,173
Patented May 7, 1963

3,088,173
PROCESS FOR PREPARING ORIENTED POLYMERIC LINEAR TEREPHTHALATE FILM WITH A DEGLOSSED WRITEABLE SURFACE
John Willard Jones, Wilmington, Del., assignor to E. I. du Pont de Nemours and Company, Wilmington, Del., a corporation of Delaware
Filed June 2, 1961, Ser. No. 114,356
6 Claims. (Cl. 18—48)

This invention relates to an oriented polymeric linear terephthalate film and a process for its preparation. More particularly, this invention relates to a low luster, oriented polyethylene terephthalate film having a surface readily receptive to ink and pencil markings and a process for its preparation.

Polyethylene terephthalate film, more particularly, polyethylene terephthalate film which has been molecularly oriented by stretching and/or rolling in two mutually perpendicular directions, is a tough, durable, dimensionally stable film. It possesses many desirable characteristics which should make it an outstanding candidate for employment in drafting, recording and surfacing applications. These films, however, possess limited ability to accept ink, pencil markings, and have undesirable high gloss and transparency. Attempts have been made to overcome these disadvantages by the incorporation of additives, the application of coatings, chemical treatments, and mechanical abrasion. Additives to the polymer may interfere with the preparation of the polymer; coatings are frequently inferior to the base film in toughness, may delaminate, or be poor in abrasion resistance. All of these processes add complications and expense to the preparation of the desired product.

It is an object of this invention to provide an oriented polymeric linear terephthalate film and a process for its preparation. It is a further object to provide a low luster, oriented polyethylene terephthalate film having a surface readily receptive to ink and pencil markings and a process for its preparation. It is still a further object to provide a process for the preparation of a low luster, oriented polyethylene terephthalate film having a surface readily receptive to ink and pencil markings which is adaptable for use as a tracing film. These and other objects will appear hereinafter.

In the annexed drawings FIGS. 1 and 2 are graphical illustrations of the results achieved by stretching film at various temperatures as described in Example VIII, infra. FIG. 3 is a graphical illustration of the results achieved by stretching film to various extents as described in Example X, infra.

These and other objects are accomplished by the process of this invention by stretching substantially amorphous polymeric linear terephthalate film after attaining a temperature within the range of 110 to 114° C. in both the longitudinal and transverse directions to an extent of at least 1.25 times its original dimensions, cooling the film below its second order transition temperature, and stretching the film a second time after attaining a temperature within the range of 110 to 114° C. in both the longitudinal and transverse directions to an extent of at least 1.25 times its dimensions after the first stretch, the total extent of the stretch being 3 to 10 times that of the original dimensions of the film.

A preferred embodiment of this invention is concerned with the process of heating substantially amorphous polymeric linear terephthalate film to a temperature of about 112° C. within a period of time of at the most 3 minutes, stretching the film after attaining this temperature in both the longitudinal and transverse directions to an extent of at least 1.25 times its original dimensions at a linear rate of speed of 50 to 500 percent per second, cooling the film below its second order transition temperature, reheating the once stretched film to a temperature of about 112° C. within a period of time of at the most 3 minutes, and stretching the film after attaining this temperature in both the longitudinal and transverse directions to an extent of at least 1.25 times its dimensions after the first stretch at a linear rate of speed of 50 to 500 percent per second, the total extent of the stretch being 3 to 5 times that of the original dimensions of the film.

Any film consisting of a substantially amorphous polymeric linear terephthalate can be employed in the process of this invention and can be formed by the process disclosed in U.S. Patent 2,465,319. The preferred film of this invention is substantially amorphous polyethylene terephthalate film.

The process of the present invention in its broad and preferred aspects has certain critical steps. It is necessary that there be two separate stretching operations with a cooling of the film between stretching operations. The temperature at which the two separate stretching operations are carried out is also critical to the process. Details of these steps and other features of the process will be shown hereinafter.

It has been found that an oriented polyethylene terephthalate film with a deglossed writeable surface can be prepared by stretching the film in two stages to a total extent of 3 to 10 times its initial dimensions, i.e., its initial transverse and longitudinal dimensions. Preferably, the total extent of the stretch should be between 3 to 5 times the initial dimensions of the film with the most preferably total stretch being 4 times the initial dimensions of the film.

The extent of the stretch in the first stretching operation must be at least 1.25 times the initial dimensions of the film. The extent of the stretch in the second stretching operation must be at least 1.25 times the dimensions of the film after the first stretching operation, and be sufficient such that the total stretch (extent of stretch in first stretch operation multiplied by the extent of stretch in the second stretch operation) is at least 3 and not greater than 10. In each of the two stretching operations the film must be stretched to the same extent in both directions. The film can, in either stretching operation, be stretched simultaneously in both the longitudinal and transverse directions or can be stretched sequentially, i.e., stretched first in the longitudinal direction and then in the transverse direction or vice versa. It is preferred that the film be stretched simultaneously in both directions in the first stretching operation and the second stretching operation. The stretching apparatus employed in the process of this invention is similar to that described in Peterson, U.S. Patent 2,759,217.

The linear rate of stretch in both directions is preferably 50 to 500 percent per second. The most preferable rate of stretch is 100 percent per second.

It is essential that between the two stretching operations that the film be cooled below the second order transition temperature. This is defined as the temperature at which a discontinuity occurs in the curve of a first derivative thermodynamic quantity with temperature. It is correlated with yield temperature and polymer fluidity and can be observed from a plot of density, specific volume, specific heat, sonic modulus or index of refraction against temperature. The second order transition temperature for polyethylene terephthalate is approximately 70° C. Any air blast apparatus can be used to cool the film, but generally any conventional coating (air) device can be employed to cool the film.

Another critical process condition of the present invention is the temperature at which the two stretching operations are carried out. The temperature must be maintained within the range of 110 to 114° C. and preferably at about 112° C. The film before the start of either stretching operation must be brought up to this temperature. Depending on the type of equipment and effectiveness of the heating means employed, it will be necessary to preheat the film for a period of from 30 seconds to 3 minutes. Preheat times in excess of 3 minutes markedly increase the density of the film thereby leading to non-uniform stretching and development of clear areas.

After the two stretching operations, the film can be heat-set while still under tension to impart to the film an enhanced dimensional stability at elevated temperatures. This property is referred to as "thermal dimensional stability" and is a measure of the ability of the film to resist shrinkage at elevated temperatures. The film can be heat-set at a temperature within the range of 150 to 235° C. and preferably at about 185° C.

The invention will be more fully understood by referring to the following examples.

EXAMPLE I

Substantially amorphous polyethylene terephthalate film, 28 mils thick, was placed in a laboratory stretcher designed for simultaneously stretching a polymeric film in both the longitudinal (LD) and transverse (TD) directions. The stretcher was previously heated to 112° C. The film was clamped on all four sides and allowed to preheat for 3 minutes at 112° C. The film was then simultaneously stretched two times its original dimensions (X) in both the LD and TD (2X by 2X) at a linear rate of 100 percent per second. The film was cooled with an air blast to reduce the temperature to below the second order transition temperature (70° C.) and removed from the stretcher. The film was transparent and uniformly stretched.

A portion of this film was placed in a stretcher and stretched a second time under the same conditions for the first stretch. The film surface was drastically reduced in gloss. The surface would accept ball point pen, pencil, ink pen and typewriter substantially better than oriented polyethylene terephthalate film prepared by methods known to the art. The pencil marks could readily be erased.

EXAMPLES II to VI

Five samples of substantially amorphous polyethylene terephthalate film 28 mils thick were stretched in a stretcher similar to that described in Example I. Films were preheated for 3 minutes to bring the temperature to 112° C. The films were then simultaneously stretched in both directions at 111° to 112° C. at a linear rate of 100 percent per second to the following varying extents:

Example II: 1.5X x 1.5X
Example III: 1.25X x 1.25X
Example IV: 1.5X x 1.5X
Example V: 2X x 2X
Example VI: 2X x 2X where X is the original dimensions of the film.

The films were cooled with an air blast below 70° C. and again brought up to 111 to 112° C. by preheating for 3 minutes. They were then stretched a second time in both directions at a linear rate of speed of 100 percent per second to the following varying extents:

Example II: 3Y x 3Y—total stretch 4.5X x 4.5X
Example III: 4Y x 4Y—total stretch 5X x 5X
Example IV: 3Y x 3Y—total stretch 4.5X x 4.5X
Example V: 2Y x 2Y—total stretch 4X x 4X
Example VI: 2Y x 2Y—total stretch 4X x 4X where Y is the dimensions of the film after the first stretch.

The effectiveness of the deglossing by the process is illustrated by the use of Gardner 60° gloss meter (Gardner haze meter, manufactured by the Gardner Corp. of Bethesda, Maryland). The meter was standardized by a reference block at 89 percent. The gloss of all five films was less than 17 percent.

Example V was clamped in a frame and heat set in an oven for 1 minute at 185° C. The surface characteristics were not altered by the heat-setting operation.

The physical properties of the stretched deglossed polyethylene terephthalate films compared with that of an unoriented substantially amorphous polyethylene terephthalate film are shown in Table A below.

*Table A*

PHYSICAL PROPERTIES OF POLYETHYLENE TEREPHTHALATE FILM PREPARED BY TWO SEPARATE STRETCHING STEPS

| Property | Control: Substantially Amorphous Unoriented P.T.[1] Film | Example II: P.T. Film Stretched $1.5X^2$, cooled and stretched $3Y^2$ | Example III: P.T. Film Stretched $1.25X^2$, cooled and stretched $4Y^2$ | Example IV: P.T. Film Stretched $1.5X^2$, cooled and stretched $3Y^2$ | Example V: P.T. Film Stretched $2X^2$, cooled, and stretched $2Y^2$; heat set at 185° C. (1 min.) | Example 6: P.T. Film Stretched $2X^2$, cooled and stretched $2Y^2$ |
|---|---|---|---|---|---|---|
| Thickness, mils | 1.7 | 1.2 | 1.3 | 1.5 | 2.8 | 2.6 |
| Gloss 60° | 140 | 13 | 12 | 13 | 9 | 10 |
| Modulus, K p.s.i.: | | | | | | |
| LD | 357 | 410 | | | 407 | 389 |
| TD | 340 | 420 | | | 365 | 368 |
| Tensile Strength, K p.s.i.: | | | | | | |
| LD | 8.6 | 16.6 | | | 17.4 | 17.7 |
| TD | 7.5 | 18.7 | | | 13.9 | 17.7 |
| Elongation, percent: | | | | | | |
| LD | 500 | 132 | | | 200 | 214 |
| TD | 450 | 157 | | | 227 | 238 |
| Density (g./cc.) | 1.340 | 1.360 | | | 1.381 | 1.363 |

[1] Polyethylene terephthalate.

From the table it can be seen that the films of Examples II to VI are satisfactorily deglossed. These films are also readily receptive to surface markings. From the table it can also be seen that the film prepared by the process of the present invention exhibits enhanced physical properties characteristic of an oriented polyethylene terephthalate film prepared by methods known to the art.

EXAMPLE VII

Samples of polyethylene terephthalate film 28 mils thick were stretched to a total extent of 4X in both directions in two separate stretching operations as described in Example I. The films were stretched at 112° C. The preheat times were varied from 30 seconds to 9 minutes. Satisfactorily deglossed oriented films were obtained when preheat times of .5 to 4 minutes were employed. With a 5 minute preheat, the stretch was non-uniform and some clear areas developed. The density of the film was found to vary little up to 3 minutes preheat time but increased sharply with longer heating periods. The optimum preheat time, therefore, is about 3 minutes.

EXAMPLE VIII

Samples of substantially amorphous polyethylene terephthalate film 28 mils thick were stretched in two stages to a total extent of 4X in both directions as described in Example I. The film was allowed to preheat at a selected temperature for stretching for 3 minutes. The stretching temperatures were varied between 90 to 117° C. Both stretching operations were carried out at the same temperature. The results of this operation are shown graphically in FIGURES 1 and 2 of the drawing attached hereto. From FIGURE 1 it can be seen that stretching temperatures below 110° C. produced a uniformly stretched film which was not deglossed. Stretching temperatures in excess of 114° C. produced satisfactorily deglossed but nonuniformly stretched films. FIGURE 2 illustrates the degree of gloss of the film samples as the temperature is increased from 90 to 117° C. As can be seen, the minimum gloss results at temperatures ranging between 110 to 117° C. The preferred temperature range under the conditions used is 112° C. ±1° C.

EXAMPLE IX

Substantially amorphous polyethylene terephthalate film 28 mils in thickness was stretched 4X in the LD only at 112° C. The simultaneous stretching apparatus of Example I was employed with either the LD or TD clamps disconnected. The preheat time was 3 minutes. The film was cooled below 70° C. and again preheated at 112° C. for 3 minutes. The film was then stretched 4X in the TD only. The resulting film was clear and did not develop the desired surface characteristics, thereby showing the criticality of conducting the stretching of the film in two separate steps with the cooling step intervening.

EXAMPLE X

Samples of 28 mil thick substantially amorphous polyethylene terephthalate film were stretched under conditions substantially identical with those described in Example I. The films were preheated for 3 minutes at 112° C., stretched simultaneously in both the LD and TD at 112° C., cooled below 70° C., preheated to 112° C. for 3 minutes and then simultaneously stretched in both directions at that temperature. The final total extent of stretch ($X^2$ x $Y^2$), where $X^2$ is the extent of stretch of the first simultaneous two-directional stretch, and $Y^2$ is the extent of stretch of the second, were varied between 1.5 and 5. For example, a film stretched 2X x 2X ($2X^2$), cooled, and stretched 2Y x 2Y ($2Y^2$) would give a total extent of stretch ($X^2$ x $Y^2$) of 4X. The gloss of the stretched film was measured with a Gardner 60° gloss meter calibrated with a black glass plate of gloss 89. The average of 4 readings on each side of the film was taken as the gloss. The results are shown in FIGURE 3 of the attached drawing. The gloss decreased from 70 at a total extent of stretch of 1.5 to 10 at a total extent of stretch of 4. There was a slight increase in gloss (12) at a total extent of stretch of 5. Stretching at higher ratios appears to increase the gloss. This was verified by conducting two bi-directional stretches on a polyethylene terephthalate film with an aggregate stretch of about 15X x 15X. This produced a thin film with only moderate deglossing; the preferred aggregate stretch ranges between 3X x 3X to 5X x 5X.

EXAMPLES IX TO XVI

Samples of substantially amorphous polyethylene terephthalate film 28 mils thick were preheated to 112° C. for 3 minutes and subjected to one of the following varied stretching operations:

Example XI: 4X LD x 4X TD—no second stretch
Example XII: 4X LD x 4X TD—cooled—2Y LD only
Example XIII: 2X LD x 4X TD—no second stretch
Example XIV: 2X LD x 4X TD—cooled—2Y LD only
Example XV: 3X LD x 3X TD—no second stretch
Example XVI: 3X LD x 3X TD—cooled—1.5Y LD x 1.5Y TD where X and Y are as defined in Examples II to VI.

In Examples XI, XIII and XV the film was stretched simultaneously in both the LD and TD at 112° C. to varying extents. No second stretching operation was performed. In Examples XII and XIV the film was simultaneously stretched in both the LD and TD at 112° C. to varying extents, cooled, and then sequentially stretched 2Y in the LD only. In Example XVI the film was stretched twice in accordance with the dictates of the present invention to an extent of 3X in both the LD and TD, cooled, and then stretched 1.5Y in both directions. Table B, listed below, lists the extent of stretch in the first stretching operation, the extent of stretch in the second stretching operation where applicable, and the gloss reading as measured by the Gardner 60° gloss meter.

*Table B*

| Example | First Stretch | Second Stretch | Gloss |
|---|---|---|---|
| XI | $4X^2$ | | 31 |
| XII | $4X^2$ | 2Y LD | 35 |
| XIII | 2X LD-4X TD | | 42 |
| XIV | 2X LD-4X TD | 2Y LD | 45 |
| XV | $3X^2$ | | 36 |
| XVI | $3X^2$ | $1.5Y^2$ | 13 |

As can be seen from the table, polyethylene terephthalate film stretched at least 3X in both directions in one stretching operation only, and film stretched to a total aggregate stretch of 3X x 3X or greater, by stretching first in both directions, cooling and then stretching in one direction only, do not exhibit satisfactorily deglossed surfaces as evidenced by Gardner 60° gloss meter reading of greater than 25 (the maximum value for satisfactorily deglossed film). The film, processed as described herein by stretching to an aggregate stretch of 3X x 3X or greater in two separate stretching operations with an intermediate cooling step, displayed satisfactorily deglossed surface as evidenced by a Gardner 60° gloss meter reading of 13.

Attempts to produce a deglossed film by stretching the film 3 to 10 times its original dimensions in both directions in one stretching operation resulted in no appreciable lessening in the gloss of the film. Similarly, a biaxial stretching operation followed by an unaxial stretching operation, e.g., 4X x 4X followed by 2Y x 0Y resulted in little or no change in degree of gloss.

The process of the present invention gives a tough, durable, dimensionally stable polyethylene terephthalate film having a surface characterized by a low luster, enhanced receptivity to ink and pencil markings, chemical treatments and applications of coatings of dissimilar materials. Such a film is ideally suited for such end uses as drafting films, typing materials (e.g., top sheets for a mimeograph master [Multilith]), base films for specific end use coatings, surfacing applications requiring delustered materials such as wall coverings, etc., recording tape, adhesive tapes, deglossed surface tapes for mending books and papers and photo-reproduction process materials such as projection base materials and materials for contact photoprinting.

What is claimed is:
1. The process comprising: stretching substantially amorphous polymeric linear terephthalate film after at- taining a temperature within the range of 110° to 114° C. within a period of time of at the most about 3 minutes in both the longitudinal and transverse directions to an extent of at least 1.25 times its original dimensions, cooling said film below its second order transition temperature, and stretching said film a second time after attaining a temperature within the range of 110° to 114° C. within a period of time of at the most about 3 minutes in both the longitudinal and transverse directions to an extent of at least 1.25 times its dimensions after the first stretch, the total extent of the stretch being 3 to 10 times that of the original dimensions of said film.

2. The process comprising: stretching substantially amorphous polymeric linear terephthalate film after attaining a temperature within the range of 110° to 114° C. within a period of time of at the most about 3 minutes in both the longitudinal and transverse directions to an extent of at least 1.25 times its original dimensions, cooling said film below its second order transition temperature, stretching said film a second time after attaining a temperature within the range of 110° to 114° C. within a period of time of at the most about 3 minutes in both the longitudinal and transverse directions to an extent of at least 1.25 times its dimensions after the first stretch, the total extent of the stretch being 3 to 10 times that of the original dimensions of said film, and heat setting said film after the second stretch at a temperature within the range of 150° to 235° C.

3. The process comprising: heating substantially amorphous polymeric linear terephthalate film to a temperature of about 112° C. within a period of time of at the most 3 minutes, stretching said film after attaining said temperature in both the longitudinal and transverse directions to an extent of at least 1.25 times its original dimensions at a rate of 50 to 500 percent per second, cooling said film below its second order transition temperature, reheating the once stretched film to a temperature of about 112° C. within a period of time of at the most 3 minutes, and stretching said film after attaining said temperature in both the longitudinal and transverse directions to an extent of at least 1.25 times its dimensions after the first stretch at a rate of 50 to 500 percent per second, the total extent of the stretch being 3 to 5 times that of the original dimensions of said film.

4. The process comprising: heating substantially amorphous polymeric linear terephthalate film to a temperature of about 112° C. within a period of time of at the most 3 minutes, stretching said film after attaining said temperature in both the longitudinal and transverse directions to an extent of at least 1.25 times its original dimensions at a rate of 50 to 500 percent per second, cooling said film below its second order transition temperature, reheating the once stretched film to a temperature of about 112° C. within a period of time of at the most 3 minutes, stretching said film after attaining said temperature in both the longitudinal and transverse directions to an extent of at least 1.25 times its dimensions after the first stretch at a rate of 50 to 500 percent per second, the total extent of the stretch being 3 to 5 times that of the original dimensions of said film, and heat setting said film after the second stretch at a temperature within the range of 150° to 235° C.

5. The process comprising: heating substantially amorphous polymeric linear terephthalate film to a temperature of about 112° C. within a period of time of at the most 3 minutes, stretching said film after attaining said temperature in both the longitudinal and transverse directions to an extent of at least 1.25 times its original dimensions at a rate of 50 to 500 percent per second, cooling said film below its second order transition temperature, reheating the once stretched film to a temperature of about 112° C. within a period of time of at the most 3 minutes, and stretching said film after attaining said temperature to an extent of at least 1.25 times its dimensions after the first stretch in both the longitudinal and transverse directions at a rate of 50 to 500 percent per second, the total extent of the stretch being 4 times that of the original dimensions of said film.

6. A process for the production of a low luster, oriented polyethylene terephthalate film comprising: heating substantially amorphous polyethylene terephthalate film to a temperature of about 112° C. over a period of 3 minutes, stretching said film after attaining said temperature simultaneously in the longitudinal and transverse directions 2 times its original dimensions at a rate of 100 percent per second, cooling said film below 70° C., reheating said film to a temperature of about 112° C. over a period of 3 minutes, and stretching the once stretched film after attaining said temperature simultaneously in the longitudinal and transverse directions 2 times its dimensions after the first stretch at a rate of 100 percent per second.

References Cited in the file of this patent

UNITED STATES PATENTS

| | | |
|---|---|---|
| 2,352,725 | Markwood | July 4, 1944 |
| 2,578,899 | Pace | Dec. 18, 1951 |
| 2,884,663 | Alles | May 5, 1959 |
| 2,948,583 | Adams | Aug. 9, 1960 |
| 2,951,305 | Seymour | Sept. 6, 1960 |
| 2,968,067 | Long | Jan. 17, 1961 |